United States Patent
Lee et al.

(10) Patent No.: US 8,958,624 B2
(45) Date of Patent: Feb. 17, 2015

(54) METHOD AND APPARATUS FOR STITCHING A PLURALITY OF IMAGES

(75) Inventors: Jae-sung Lee, Seongnam-si (KR); Jae-chool Lee, Suwon-si (KR); Hae-kyung Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 205 days.

(21) Appl. No.: 13/564,074

(22) Filed: Aug. 1, 2012

(65) Prior Publication Data

US 2013/0129179 A1  May 23, 2013

(30) Foreign Application Priority Data

Nov. 21, 2011 (KR) .................. 10-2011-0121736

(51) Int. Cl.
*G06K 9/00* (2006.01)
*G06T 3/40* (2006.01)

(52) U.S. Cl.
CPC .................. *G06T 3/4038* (2013.01)
USPC ........................................... 382/132

(58) Field of Classification Search
None
See application file for complete search history.

(56) References Cited

U.S. PATENT DOCUMENTS

| 2002/0109113 | A1 | 8/2002 | Wang et al. | |
| 2002/0159564 | A1 * | 10/2002 | Wang et al. | 378/98.12 |
| 2002/0191750 | A1 * | 12/2002 | Wang et al. | 378/152 |
| 2008/0152088 | A1 * | 6/2008 | Wang et al. | 378/98.12 |
| 2010/0014780 | A1 | 1/2010 | Kalayeh | |

* cited by examiner

*Primary Examiner* — Hadi Akhavannik
(74) *Attorney, Agent, or Firm* — Sughrue Mion, PLLC (57) ABSTRACT

A method and apparatus for stitching a plurality of images. The method includes capturing a first image and a second image; variably setting a position and size of a template for image stitching with respect to the captured first image or the captured second image, and determining stitch positions of the first image and the second image, based on the template that is variably set. In addition, the method includes stitching the first image and the second image, based on the determined stitch positions.

21 Claims, 6 Drawing Sheets

METHOD AND APPARATUS FOR STITCHING A PLURALITY OF IMAGES

CROSS-REFERENCE TO RELATED PATENT APPLICATION

This application claims the benefit of Korean Patent Application No. 10-2011-0121736, filed on Nov. 21, 2011, in the Korean Intellectual Property Office, the disclosure of which is incorporated herein in its entirety by reference.

BACKGROUND

1. Field

The present disclosure relates to a method and apparatus for stitching a plurality of images, and more particularly, to a method and apparatus for rapidly stitching a plurality of images into a single image.

2. Description of the Related Art

X-rays are electromagnetic waves having a wavelength in the range of 0.01 to 100 angstroms (Å). In general, since X-rays penetrate into a subject, X-rays are widely used in medical equipment for photographing an inner part of a living body or a nondestructive inspection equipment of the general industry.

Image capturing apparatuses using X-ray use a basic principle that X-rays emitted from an X-ray tube (or an X-ray source) are transmitted through a subject and a difference in intensities of the transmitted X-rays is detected by an X-ray detector to capture an image of an internal structure of the subject. The internal structure of the subject is easily depicted using a principle that the transmittance of X-rays varies according to a density of the subject and an atomic number of atoms included in the subject. As a wavelength of X-rays is reduced, the transmittance of X-rays is increased and an image is brighter.

That is, in general, an image capturing apparatus using X-rays includes an X-ray source, an X-ray detector, and an image processing device. The X-ray source projects X-rays in a predetermined X-ray projection condition. In addition, the X-ray detector obtains image data based on the X-rays transmitted through a subject and transmits the image data to the image processing device. The image processing device processes the image data and transmits an image of the subject to a display unit.

SUMMARY

Exemplary embodiments of the present disclosure include a method of stitching a plurality of images, the method including capturing a first image and a second image; variably setting a position and size of a template for image stitching with respect to the captured first image or the captured second image; determining stitch positions of the first image and the second image, based on the template that is variably set; and stitching the first image and the second image, based on the determined stitch positions.

Other exemplary embodiments of the present disclosure include an apparatus for of stitching a plurality of images, the apparatus including an image capturing unit for capturing a first image and a second image; a template setting unit for variably setting a position and size of a template for image stitching with respect to the captured first image or the captured second image; a controller for determining stitch positions of the first image and the second image, based on the template that is variably set; and a stitching unit for stitching the first image and the second image, based on the determined stitch positions.

Other exemplary embodiments of the present disclosure include a computer-readable recording medium having recorded thereon a program for executing the method.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE EXEMPLARY EMBODIMENTS

The attached drawings for illustrating exemplary embodiments are referred to in order to gain a sufficient understanding of the present disclosure, the merits thereof, and the objectives accomplished by the implementation of the exemplary embodiments. Exemplary embodiments may, however, be embodied in many different forms and should not be construed as being limited to the exemplary embodiments set forth herein; rather, these exemplary embodiments are provided such that this disclosure will be thorough, and will convey the concept of exemplary embodiments to one of ordinary skill in the art. Meanwhile, the terminology used herein is for the purpose of describing particular exemplary embodiments and is not intended to limit the disclosure. Like reference numerals in the drawings denote like elements.

In the following description of exemplary embodiments, a detailed description of known functions and configurations incorporated herein will be omitted for clarity. The terms used in the specification are defined in consideration of functions used in exemplary embodiments, and can be changed according to the intent or conventionally used methods of clients, operators, and users. Accordingly, definitions of the terms should be understood on the basis of the entire description of the present specification.

It is important to capture an image of an entire skeletal structure in order to diagnose the spine or legs of the human body. In this case, since a related image capturing apparatus using X-rays includes a detector of a limited size, it is difficult to photograph an entire structure by using a single photographing operation. Similarly, when it is necessary to capture an image of an entire internal structure of a subject in a general industrial field without physically deforming the subject, or when the subject has a large-sized or complex structure, it is frequently difficult to capture an image of the structure based only on a result of a single photographing operation.

Thus, in order to capture an image of an entire structure of a subject, technologies of using a detector screen having a particular structure or stitching a plurality of X-ray captured images into a single image have been developed.

However, it is difficult to use the detector screen having a particular structure in a conventional image capturing apparatus.

When using a template for stitching a plurality of X-ray captured images into a single image, it is difficult to finely and accurately stitch images if the size and position of the template is set prior to the X-ray images being captured because the subject may have an excessive size or the subject may be leaning to the right or left while being photographed, causing the templates to be outside a predetermined range.

In addition, when a template having a block shape is used, an efficiency of stitching images may be reduced because the template having a block shape is vulnerable to solarization (i.e. inversion) between images in a stepping mode in which an image is captured while an X-ray source is moved.

According to exemplary embodiments of the present disclosure, there is a method of stitching a plurality of images. In the method, a first image and a second image are captured and a position and a size of a template for image stitching are variably set with respect to the captured first image or the captured second image. In addition, in the method, the captured first image and the captured second image are stitched together based on the template that is variably set. That is, according to exemplary embodiments, a plurality of X-ray captured images may be rapidly stitched into a single image regardless of the size, shape, or position of a subject.

When two or more images are captured, a plurality of images, for examples, a first image and a second image, the second image and a third image, the third image and a fourth image, and the like may be stitched into a single large stitched image. In other words, a plurality of images captured by photographing operations may be stitched into a single large stitched image by using a plurality of stitching operations.

However, the present disclosure is not limited to the above description, and other aspects that are not recited here may be clearly comprehended by one of ordinary skill in the art from the following descriptions.

Hereinafter, exemplary embodiments of the present disclosure will be described in detail.

Figure 1A:
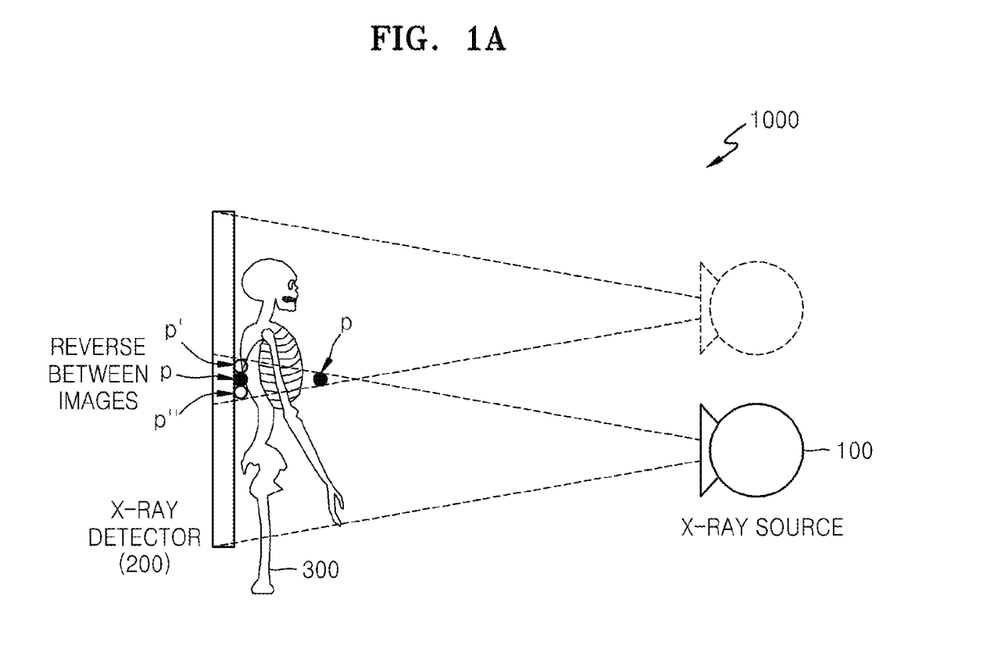
FIG. 1A is a diagram showing a case where a subject is captured by an X-ray apparatus, according to exemplary embodiments of the present disclosure.

FIG. 1A is a diagram showing a case where a subject 300 is captured by an X-ray apparatus, according to exemplary embodiments of the present disclosure.

In general, an X-ray detector 200 of an image capturing apparatus using X-ray has a limited size. Thus, a method of capturing an image of an entire structure of the subject 300 by stitching a plurality of captured images may be used. A stepping mode in which the subject 300 is photographed while an X-ray source 100 is moved horizontally and vertically may be frequently used by using the method.

Referring to FIG. 1A, the stepping mode in which an image is captured while the X-ray source 100 is moved horizontally and vertically causes solarization (i.e. inversion) between captured images of the subject 300. For example, when the X-ray source 100 photographs an upper portion of the subject 300, a point p of the subject 300 is detected at a position p" of the X-ray detector 200. When the X-ray source 100 photographs a lower portion of the subject 300, the point p of the subject 300 is detected at a position p' of the X-ray detector 200. That is, with respect to the point p of the subject 300, solarization in which upper and lower portions are reversed according to a photographing position of the X-ray source 100 is caused. Thus, there is a need for a template for stitching a plurality of images while minimizing influence of solarization.

Figure 1B:
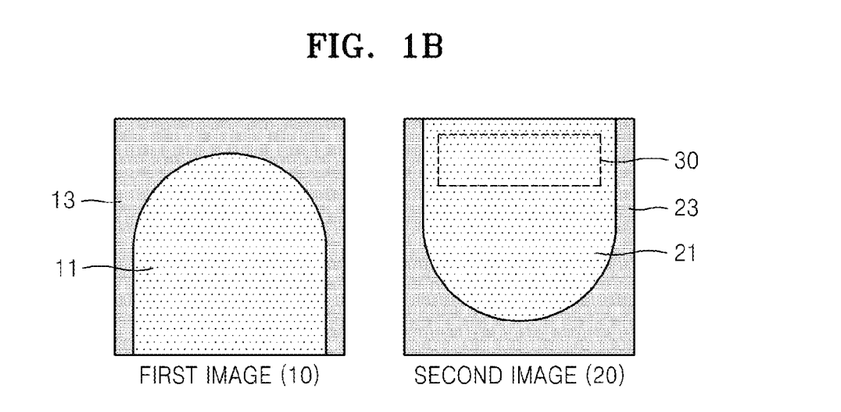
FIG. 1B is a set of X-ray captured images according to related art, wherein the size and position of the template is set prior to the X-ray images being captured.

FIG. 1B is a set of diagrams showing X-ray captured images according to related art, wherein the size and position of the template 30 is set prior to the X-ray images being captured.

Referring to FIGS. 1A and 1B, for example, a first image 10 may be captured by photographing an upper portion of the subject 300 by the X-ray source 100. The first image 10 may include an image region 11 and a background region 13 of the subject 300 through which X-rays are transmitted. A second image 20 may be captured by photographing a lower portion of the subject 300 by the X-ray source 100. The second image 20 may include an image region 21 and a background region 23 of the subject 300 through which X-rays are transmitted. In addition, the second image 20 may include the template 30, the size and position of which were set prior to the X-ray images being captured. The template 30 may refer to a region in an image.

As shown in FIG. 1B, the size and position of template 30 were set prior to the X-ray images being captured. As a result, image region 21 of the subject 300 is outside a range of the template 30. Since not all portions of the image region 21 of the subject 300 are included in the template 30, the accuracy of stitching a plurality of images may be reduced.

Figure 2:
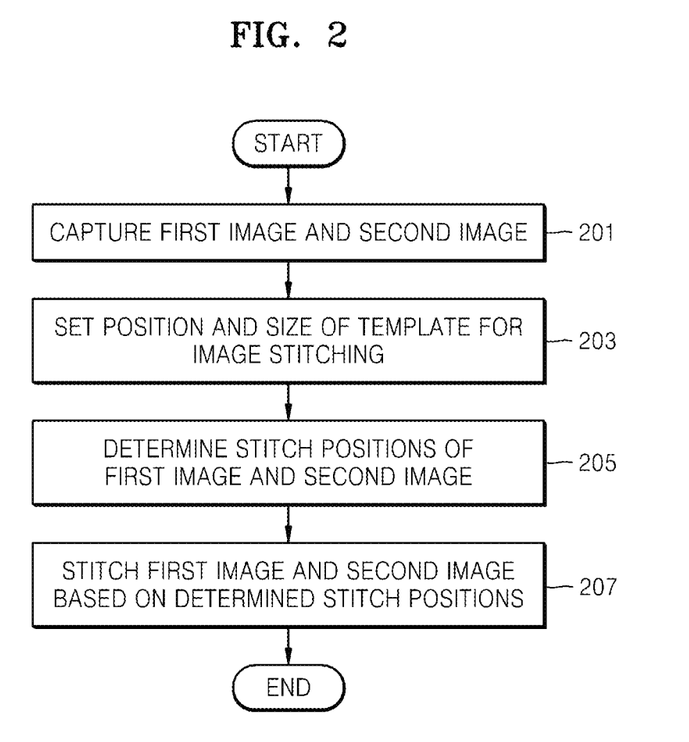
FIG. 2 is a flowchart of a method of stitching a plurality of images, according to exemplary embodiments of the present disclosure.

FIG. 2 is a flowchart of a method of stitching a plurality of images, according to exemplary embodiments of the present disclosure.

The method according to exemplary embodiments may include capturing (201) a first image and a second image, variably setting (203) a position and size of a template for image stitching with respect to the captured first image or the captured second image, and determining (205) stitch positions of the first image and the second image, based on the template that is variably set. In addition, the method according to exemplary embodiments may further include stitching (207) the first image and the second image, based on the determined stitch positions.

The capturing (201) of the first image and the second image may further include decimating each of the first image and the second image. Decimation refers to a process in which a sampling rate of an original signal is downsampled to have a lower sampling rate than the original signal to reduce the number of samples. By decimating each of the first image and the second image, each of the first image and the second image are separated into a plurality of scales (for example, a first image at a ½ scale, a first image at a ¼ scale, etc.). By decimating each of the first image and the second image, the images obtained by stitching the first image and the second image may be captured.

By reducing the number of samples by decimation, a signal processing speed may be increased and an effect of a low-pass filter may be captured.

In the variably setting (203) of the position and size of the template, the position and size of the template may be set based on each of the plurality of scales with respect to the images obtained by decimating the first image into a plurality of scales in operation 201 and the images obtained by decimating the second image into a plurality of scales in operation 201.

In the determining (205) of the stitch positions of the first image and the second image, based on the set template, the stitch positions may be determined while a scale is increased from a lowermost scale by using correlation between the images obtained by decimating the first image into a plurality of scales in operation 201 and images obtained by decimating the second image into a plurality of scales in operation 201.

The variably setting (203) of the position and size of the template may further include setting a template parameter based on the first image and the second image and determining the position and size of the template. The position and size of the template may be adjusted based on a boundary between a subject and a background. In other words, the position and size of the template may be adjusted such that the template may contain the subject in a direction perpendicular to the boundary between the subject and the background. In addition, the position of the template may be determined based on the boundary between the subject and the background and the size of the template may be adjusted such that a size of the template in a direction perpendicular to the boundary between the subject and the background and a size of the template parallel to the boundary may be different from each other. In other words, the template need not be square.

In the determining (205) of the stitch positions of the first image and the second image, based on the template that is variably set, a correlation coefficient may be used as a matching metric.

The stitching (207) of the first image and the second image may further include adjusting and stitching the first image or the second image based on the determined stitch positions. The adjusting may include a series of operations of processing the first image or the second image such that the first image and the second image may match each other by entirely or partially cutting the first image or the second image, rotating the first image or the second image, or adjusting a phase of the first image or the second image.

The stitching (207) of the first image and the second image may further include blending the first image and the second image, based the determined stitch positions. Blending between images may include adjusting a blending rate of the first image and the second image in the vicinity of an image stitch portion so as to make the image stitch portion smooth and natural.

Figure 3:
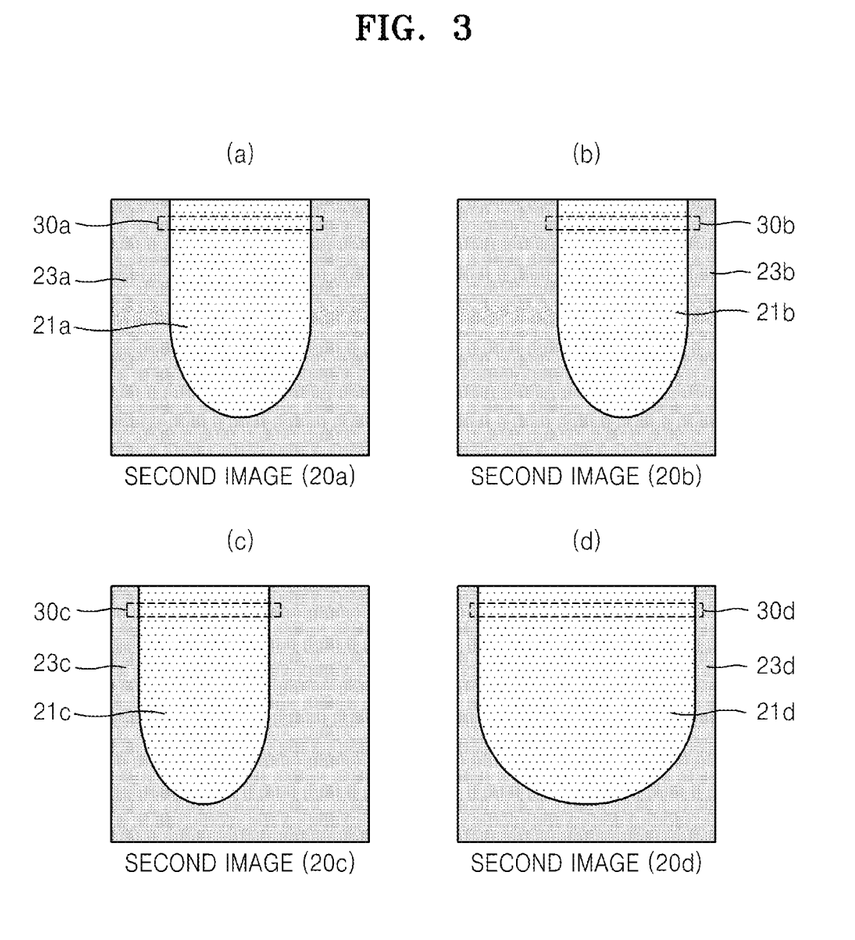
FIG. 3 is a set of X-ray captured images to which variable templates are applied, according to exemplary embodiments of the present disclosure.

FIG. 3 is a set of X-ray captured images to which variable templates are applied, according to exemplary embodiments of the present disclosure.

FIG. 3(a) shows a second image 20a that is captured by photographing a subject by an X-ray image capturing apparatus 1000 when the subject is generally positioned at the center of the X-ray detector 200. The second image 20a may include an image region 21a of the photographed subject, a background region 23a, and a template 30a that is variably set.

FIG. 3(b) shows a second image 20b that is captured by photographing a subject by the X-ray image capturing apparatus 1000 when the subject leans to the right of the X-ray detector 200. The second image 20b may include an image region 21b of the photographed subject, a background region 23b, and a template 30b that is variably set.

FIG. 3(c) shows a second image 20c that is captured by photographing a subject by the X-ray image capturing apparatus 1000 when the subject leans to the left of the X-ray detector 200. The second image 20c may include an image region 21c of the photographed subject, a background region 23c, and a template 30c that is variably set.

FIG. 3(d) shows a second image 20d that is captured by photographing a subject having a larger size than a general subject by the X-ray image capturing apparatus 1000 when the subject is positioned at the center of the X-ray detector 200. The second image 20d may include an image region 21d of the photographed subject, a background region 23d, and a template 30d that is variably set.

As shown in FIGS. 3(a) through 3(d), according to exemplary embodiments, the templates 30a through 30d may be set to have different sizes and positions according to a size and position of a subject. In this case, when templates are set to have different sizes and positions according to a size and position of a subject, the size of the template may be adjusted so as to contain the subject in a direction perpendicular to a boundary between the subject and a background. The size of the template may be adjusted such that a length of the template, which is measured in a direction perpendicular to the boundary, and a length of the template, which is measured in a direction parallel to the boundary, may be the same or different (refer to FIGS. 3(a) and (b)). For example, the size of the template may be adjusted such that the length of the template, which is measured in a direction perpendicular to the boundary, may be much greater than the length of the template, which is measured in a direction parallel to the boundary. For example, the template may include a line-based template. In addition, when the photographed subject leans to the right or left from a center of an image, the position of the template may be adjusted and set such that the template may contain the photographed subject that leans to the right or left from the center of an image (refer to FIGS. 3(b) and (c)).

Figure 4:
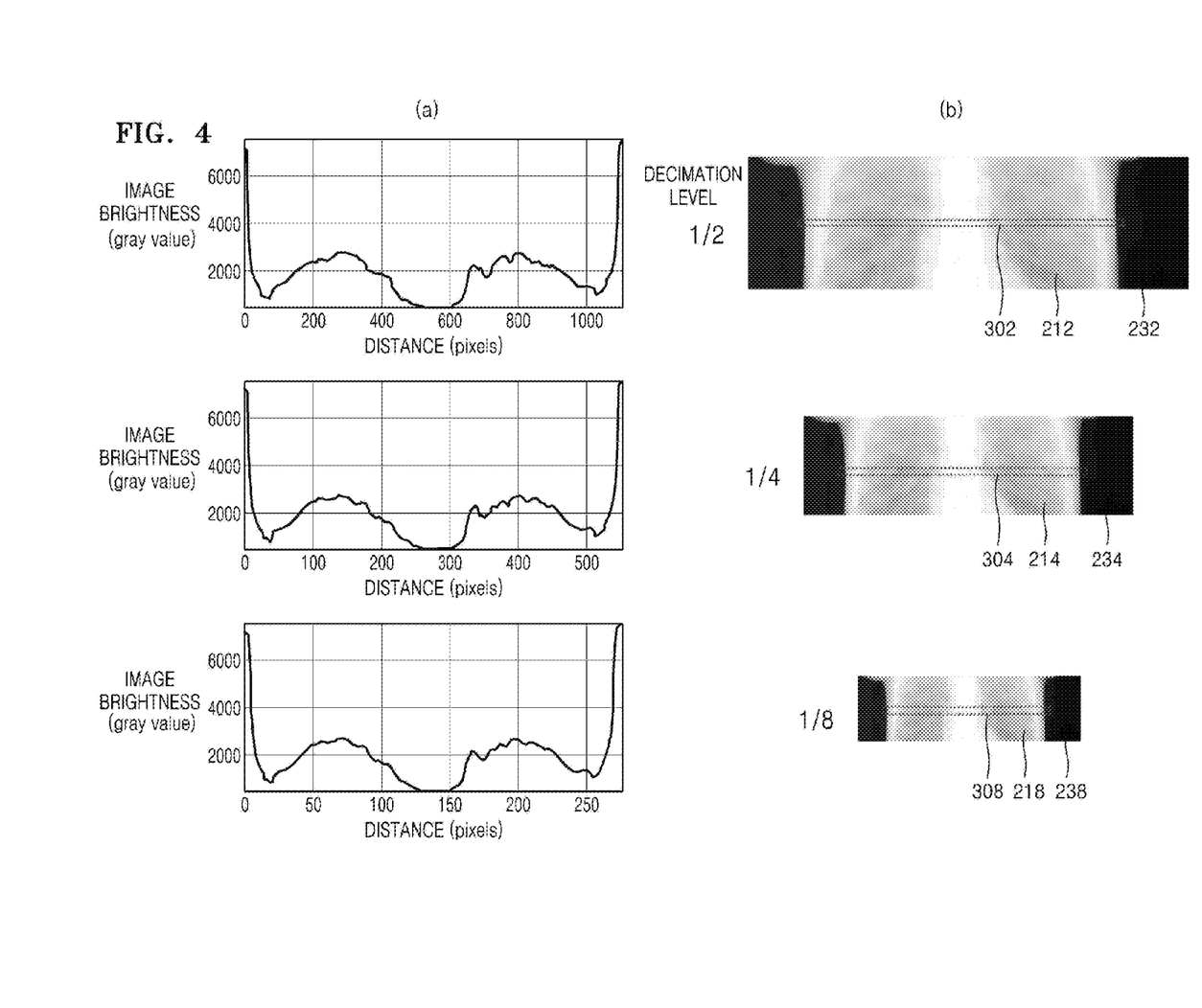
FIGS. 4A and 4B are graphs showing brightness distributions of captured images to which a template that varies according to a decimation level is applied, according to exemplary embodiments of the present disclosure.

FIGS. 4(a) and 4(b) are graphs showing brightness distributions of captured images to which a template that varies according to a decimation level applied, according to exemplary embodiments of the present disclosure.

FIG. 4(a) shows brightness distribution of an image captured prior to post-processing. FIG. 4(b) shows brightness distribution of an image captured after the post-processing is performed. The post-processing refers to an operation of processing an image in order to obtain information that a user of an X-ray apparatus is interested in, such as a doctor using the image to diagnose the subject. For example, after the captured image is processed, the brightness of the image may be reversed. For example, when the chest of the human body is photographed, regions of a captured image, which correspond to the spine of a subject, are seen as dark prior to the post-processing (refer to a distance from 500 to 600 pixels of FIG. 4(a)). On the other hand, portions of the captured image which correspond to backgrounds 232 through 238 are seen brightest. Like in FIG. 4(a), the image is seen such that the brightness of a central portion of a graph indicating the brightness of an image according to a pixel is almost 0 (gray value) (refer to a distance from 500 to 600 pixels of FIG. 4(a)). FIG. 4(b) shows a result after post-processing is performed on the captured image. After the post-processing is performed on the captured image, a region corresponding to the spine is seen bright.

As shown in FIGS. 4(a) and 4(b), when a template is variably set, photographing properties (e.g., a brightness profile of an image) in a template is also maintained in a lower decimation level and stable matching between images may be captured.

Figure 5:
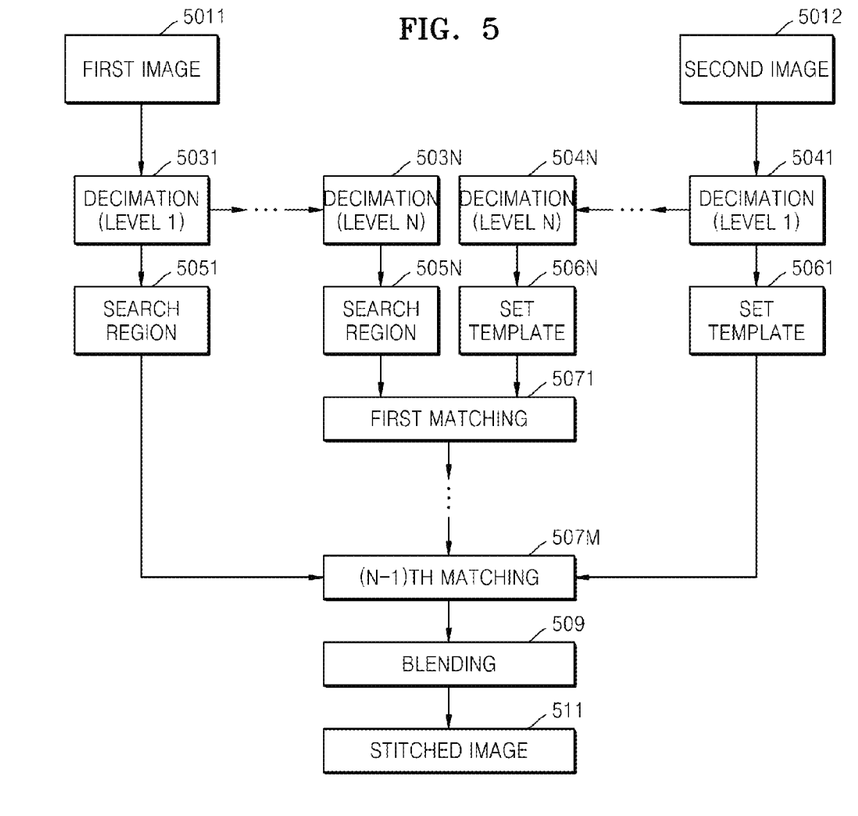
FIG. 5 is a block diagram for explaining a method of stitching a plurality of images to have a multi-level structure by decimating the images into a plurality of scales, according to exemplary embodiments of the present disclosure.

FIG. 5 is a block diagram for explaining a method of stitching a plurality of images to have a multi-level structure by decimating the images into a plurality of scales, according to exemplary embodiments of the present disclosure.

First, a first image 5011 and a second image 5012 are captured. The first image 5011 and the second image 5012 refer to predetermined images from among images that are captured by photographing a subject such that predetermined regions of the subject may overlap with each other. The first image 5011 and the second image 5012 are each decimated into a plurality of scales (e.g., 1/n, where n=2 (level 1), 4 (level 2), 8 (level 3), through 2N (level N), where N is a positive integer) (5031 through 503N).

A search region is set in an image that is decimated to have a level N from among images obtained by decimating the first image 5011 into a plurality of scales (505N). In an image that is decimated to have a level N from among images obtained by decimating the second image 5012 into a plurality of scales, a template may be variably set according to a position and size of the subject (506N). Stitching positions of a first image 503N decimated to have a level N and a second image 504N decimated to have a level N are determined based on correlation and template matching between the first image 503N decimated to have a level N and the second image 504N decimated to have a level N (5071).

After the stitch positions are determined, the template may be further adjusted in an upper scale (for example, N-1) than the level N. The adjusting may include a series of operations of processing the first image 503N decimated to have a level N and the second image 504N decimated to have a level N such that the first image 503N decimated to have a level N and the second image 504N decimated to have a level N may appropriately match each other by entirely or partially cutting the first image 503N decimated to have a level N and the second image 504N decimated to have a level N, rotating the first image 503N decimated to have a level N and the second image 504N decimated to have a level N, or adjusting phases of the first image 503N decimated to have a level N and the second image 504N decimated to have a level N.

Likewise, an image matching operation is repeatedly performed on images that are each decimated to have a level N-1 through 1. As a decimation scale is further increased, the decimated first image and the decimated second image match each other according to respective scales (5072 through 507M, where M=N-1).

A first image (5031) which is decimated to have a level 1 and a second image (5041) which is decimated to have a level 1, are blended with each other based on an Mth matching result (509) and the stitch positions. The blending between images may include an operation of adjusting a blending rate of the first image 5031 and the second image 5041 in the vicinity of an image stitch portion so as to make the image stitch portion appear smooth and natural. The stitched image may be captured by using the blending between images (511).

Figure 6:
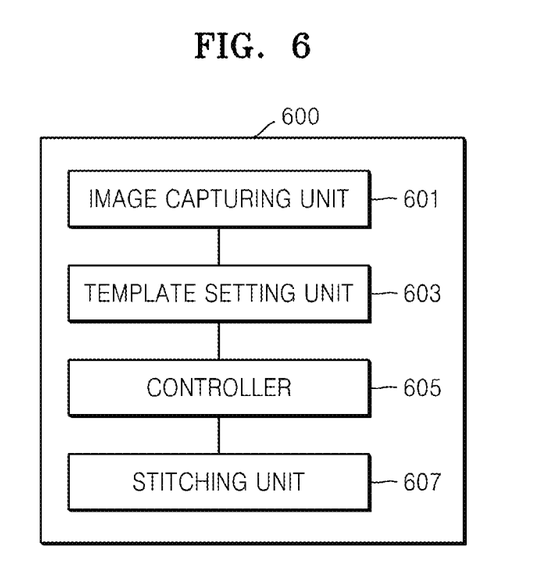
FIG. 6 is a block diagram of an apparatus for stitching a plurality of images, according to exemplary embodiments of the present disclosure.

FIG. 6 is a block diagram of an apparatus 600 for stitching a plurality of images, according to exemplary embodiments of the present disclosure.

The apparatus 600 may include an image capturing unit 601, a template setting unit 603, a controller 605, and a stitching unit 607.

The image capturing unit 601 may capture the first image 5011 and the second image 5012 from the image capturing apparatus 1000 using X-rays.

The template setting unit 603 may variably set a template according to a position and size of the subject 300 that is photographed by the image capturing apparatus 1000 using X-rays. The position and size of the template may be adjusted based on a boundary between a subject and a background. In other words, the position and size of the template may be adjusted such that the template may contain the subject 300 in a direction perpendicular to the boundary between the subject 300 and the background. In addition, the position of the template may be determined based on the boundary between the subject 300 and the background and the size of the template may be adjusted such that a size of the template, which is measured in a direction perpendicular to the boundary between the subject and the background, and a size of the template, which is measured in a direction parallel to the boundary, may be different from each other.

The controller 605 may decimate the first image 5011 and the second image 5012 into a plurality of scales. Images 5031 through 503N and 5041 through 504N obtained by decimating the first image 5011 and the second image 5012 into a plurality of scales may match each other by using correlation between images and a template that is variably set.

The stitching unit 607 may stitch images, based on a matching result about the images 5031 through 503N and 5041 through 504N.

Exemplary embodiments of the present disclosure can be written as computer programs and can be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), etc.

The methods according to the above-described exemplary embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although exemplary embodiments have been shown and described, it would be appreciated by those skilled in the art that changes may be made in these exemplary embodiments without departing from the principles and spirit of the disclosure, which are defined in the following claims and their equivalents.

What is claimed is:

1. A method of stitching a plurality of images, the method comprising:
    capturing a first image and a second image of a subject;
    variably setting a position and a size of a template for image stitching with respect to the captured first image or the captured second image;
    determining stitch positions of the first image and the second image, based on the template that is variably set; and stitching the first image and the second image, based on the determined stitch positions, wherein the variably setting of the position and the size of the template comprises setting the position and the size of the template according to a size and a position of the subject and wherein the capturing of the first image and the second image further comprises decimating the first image into a plurality of scales and decimating the second image into a plurality of scales.

2. The method of claim 1, wherein the variably setting of the position and size of the template comprises setting the position and size of the template, based on each of the plurality of scales with respect to images obtained by decimating the first image into the plurality of scales and the images obtained by decimating the second image into the plurality of scales.

3. The method of claim 2, wherein the determining of the stitch positions of the first image and the second image comprises determining the stitch positions while a scale is increased from a lowermost scale by using correlation between the images obtained by decimating the first image into the plurality of scales and images obtained by decimating the second image into the plurality of scales.

4. The method of claim 1, wherein the variably setting of the position and size of the template comprises setting a template parameter based on the first image and the second image and determining the position and size of the template.

5. The method of claim 2, wherein the position and size of the template are adjusted such that the template contains the subject in a direction perpendicular to a boundary between the subject and a background, based on the boundary between the subject and the background.

6. The method of claim 5, wherein the position of the template is determined and the size of the template is adjusted such that a size of the template, which is measured in a direction perpendicular to the boundary between the subject and the background, and a size of the template, which is measured in a direction parallel to the boundary, are different from each other, based on the boundary between the subject and the background.

7. The method of claim 1, wherein the determining of the stitch positions comprises using a correlation coefficient as a matching metric.

8. The method of claim 1, wherein the stitching of the first image and the second image comprises adjusting and stitching the first image or the second image based on the determined stitch positions.

9. The method of claim 8, wherein the stitching of the first image and the second image comprises blending the first image and the second image, based on the determined switch positions.

10. An apparatus for of stitching a plurality of images, the apparatus comprising:
an image capturing unit which captures a first image and second image of a subject;
a template setting unit which variably sets a position and a size of a template for image stitching with respect to the captured first image or the captured second image;
a controller which determines stitch positions of the first image and the second image, based on the template that is variably set; and
a stitching unit which stitches the first image and the second image, based on the determined stitch positions,
wherein the template setting unit sets the position and the size of the template according to a size and a position of the subject, and wherein the image capturing unit decimates the first image into a plurality of scales and decimates the second image into a plurality of scales.

11. The apparatus of claim 10, wherein the template setting unit sets the position and size of the template, based on each of the plurality of scales with respect to images obtained by decimating the first image into the plurality of scales and the images obtained by decimating the second image into the plurality of scales.

12. The apparatus of claim 11, wherein the controller determines the stitch positions while a scale is increased from a lowermost scale by using correlation between the images obtained by decimating the first image into the plurality of scales and images obtained by decimating the second image into the plurality of scales.

13. The apparatus of claim 10, wherein the template setting unit sets a template parameter based on the first image and the second image and determining the position and size of the template.

14. The apparatus of claim 11, wherein the position and size of the template are adjusted such that the template contains the subject in a direction perpendicular to a boundary between the subject and a background, based on the boundary between the subject and the background.

15. The apparatus of claim 14, wherein the position of the template is determined and the size of the template is adjusted such that a size of the template, which is measured in a direction perpendicular to the boundary between the subject and the background, and a size of the template, which is measured in a direction parallel to the boundary, are different from each other, based on the boundary between the subject and the background.

16. The apparatus of claim 10, wherein the controller uses a correlation coefficient as a matching metric.

17. The apparatus of claim 10, wherein the stitching unit adjusts and stitches the first image or the second image based on the determined stitch positions.

18. The apparatus of claim 17, wherein the stitching unit blends the first image and the second image, based on the determined switch positions.

19. A non-transitory computer-readable recording medium having recorded thereon a program for executing the method of claims 1.

20. A method of stitching a plurality of X-ray images, the method comprising:
capturing a first X-ray image of a subject against a background;
capturing a second X-ray image of the subject against the background;
setting a template based on the location of the subject in the first X-ray image and the location of the subject in the second X-ray image;
stitching the first X-ray image and the second X-ray image based on the template,
wherein the setting the template comprises setting a position and a size of the template according to a size and a position of the subject, and
wherein the capturing the first image further comprises decimating the first image into a plurality of scales and the capturing the second image further comprises decimating the second image into a plurality of scales.

21. An apparatus for of stitching a plurality of X-ray images, the apparatus comprising:
an image capturing unit for capturing a first X-ray image of a subject against a background and a second X-ray image of the subject against the background;

a template setting unit for setting a position and a size of a template based on the location of the subject in the first X-ray image and the location of the subject in the second X-ray image; and a stitching unit for stitching the first X-ray image and the second X-ray image, based on the template, wherein the template setting unit sets the position and the size of the template according to a size and a position of the subject, and wherein the image capturing unit decimates the first image into a plurality of scales and decimates the second image into a plurality of scales.

* * * * *